(12) United States Patent
Plöchinger

(10) Patent No.: US 11,467,051 B1
(45) Date of Patent: Oct. 11, 2022

(54) METHOD FOR CORRECTING A DUAL CAPACITANCE PRESSURE SENSOR

(71) Applicant: Heinz Plöchinger, Freinberg (AT)

(72) Inventor: Heinz Plöchinger, Freinberg (AT)

( * ) Notice: Subject to any disclaimer, the term of this patent is extended or adjusted under 35 U.S.C. 154(b) by 0 days.

(21) Appl. No.: 17/717,413

(22) Filed: Apr. 11, 2022

(51) Int. Cl.
*G01L 9/12* (2006.01)
*G01L 27/00* (2006.01)

(52) U.S. Cl.
CPC ............ *G01L 27/002* (2013.01); *G01L 9/12* (2013.01); *G01L 27/007* (2013.01)

(58) Field of Classification Search
None
See application file for complete search history.

(56) References Cited

U.S. PATENT DOCUMENTS

| | | | |
|---|---|---|---|
| 3,484,732 A | 12/1969 | Postma | |
| 4,785,669 A | 11/1988 | Benson et al. | |
| 5,911,162 A | 6/1999 | Denner | |
| 6,257,050 B1* | 7/2001 | Nagano | G01L 27/005 73/49.7 |
| 6,425,290 B2 | 7/2002 | Willcox et al. | |
| 6,837,112 B2 | 1/2005 | Ferran et al. | |
| 8,276,457 B2 | 10/2012 | Philipps | |
| 8,333,118 B2 | 12/2012 | Blankenship | |
| 9,976,922 B2 | 5/2018 | Plöchinger | |
| 2006/0283256 A1* | 12/2006 | Kumpfmuller | G01L 27/007 73/706 |
| 2007/0026562 A1 | 2/2007 | Grudzien | |
| 2013/0233086 A1* | 9/2013 | Besling | G01L 9/0045 29/825 |
| 2016/0069764 A1* | 3/2016 | Plöchinger | G01L 9/0075 73/718 |
| 2019/0226936 A1* | 7/2019 | Ishihara | G01L 9/0075 |
| 2020/0370980 A1* | 11/2020 | Mackenzie | G01L 9/0022 |

FOREIGN PATENT DOCUMENTS

| | | |
|---|---|---|
| EP | 0990127 B1 | 9/2002 |
| EP | 1309840 A2 | 5/2003 |
| EP | 1800099 A2 | 6/2007 |

\* cited by examiner

*Primary Examiner* — Herbert K Roberts
(74) *Attorney, Agent, or Firm* — Smartpat PLC

(57) ABSTRACT

A method for correcting a dual-capacitance pressure sensor for measuring fluid pressure, comprising: at a first time, taking measurements of fluid pressure based on movements of a first membrane and a second membrane of the pressure sensor; at a second time, taking measurements of fluid pressure based on movements of the first membrane and the second membrane; determining a change in the measurement results based on movements of the first membrane between the first point in time and the second point in time; determining a change in the measurement results based on movements of the second membrane between the first point in time and the second point in time; Checking whether the changes in the measurements determined are based solely on a change in fluid pressure or whether the changes in the measurements determined are due to changes in the pressure sensor, and if the latter is the case, determining a correction for the measurements determined at the second point in time.

10 Claims, 17 Drawing Sheets

Fig. 3a – Cross Section A-A'
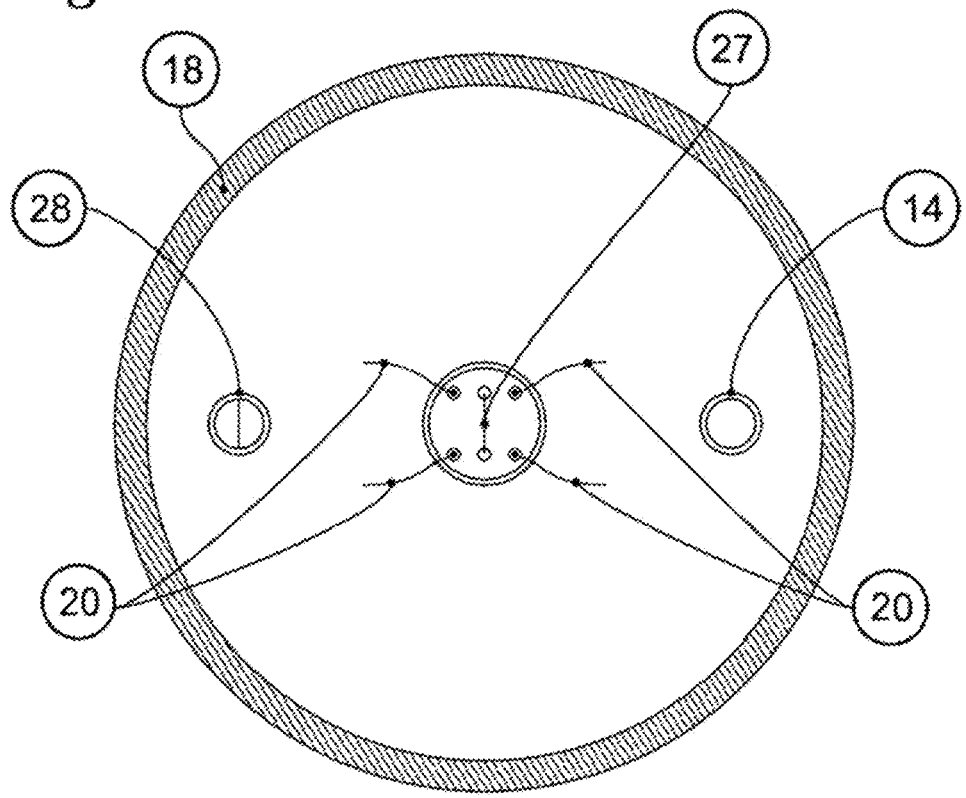
Fig. 3b – Cross Section A-A'
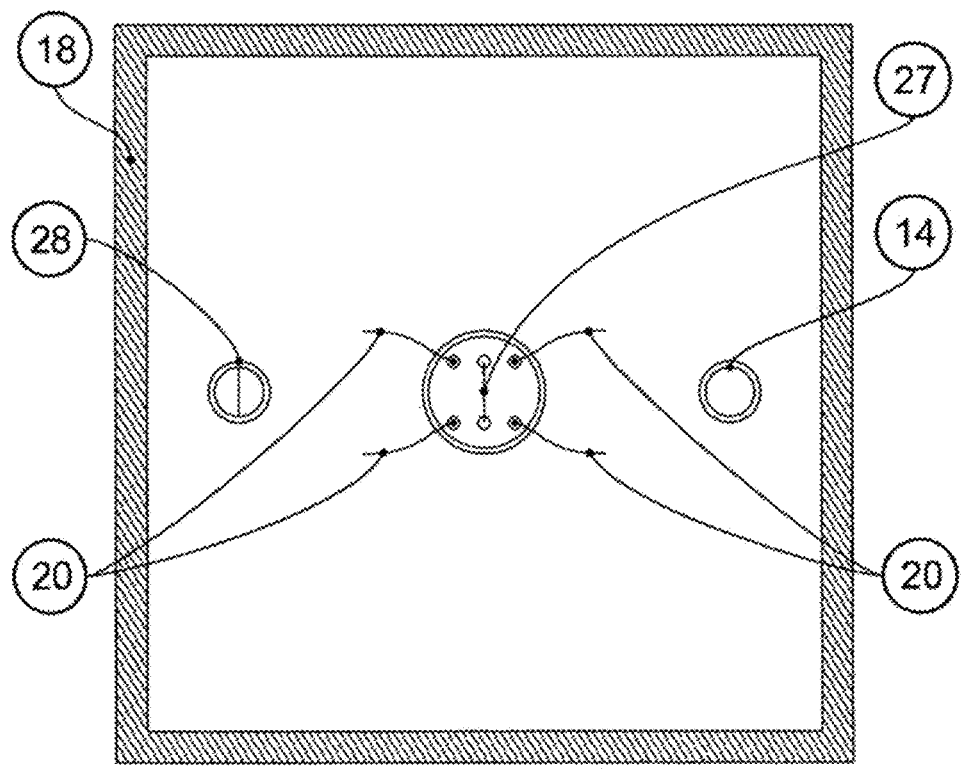

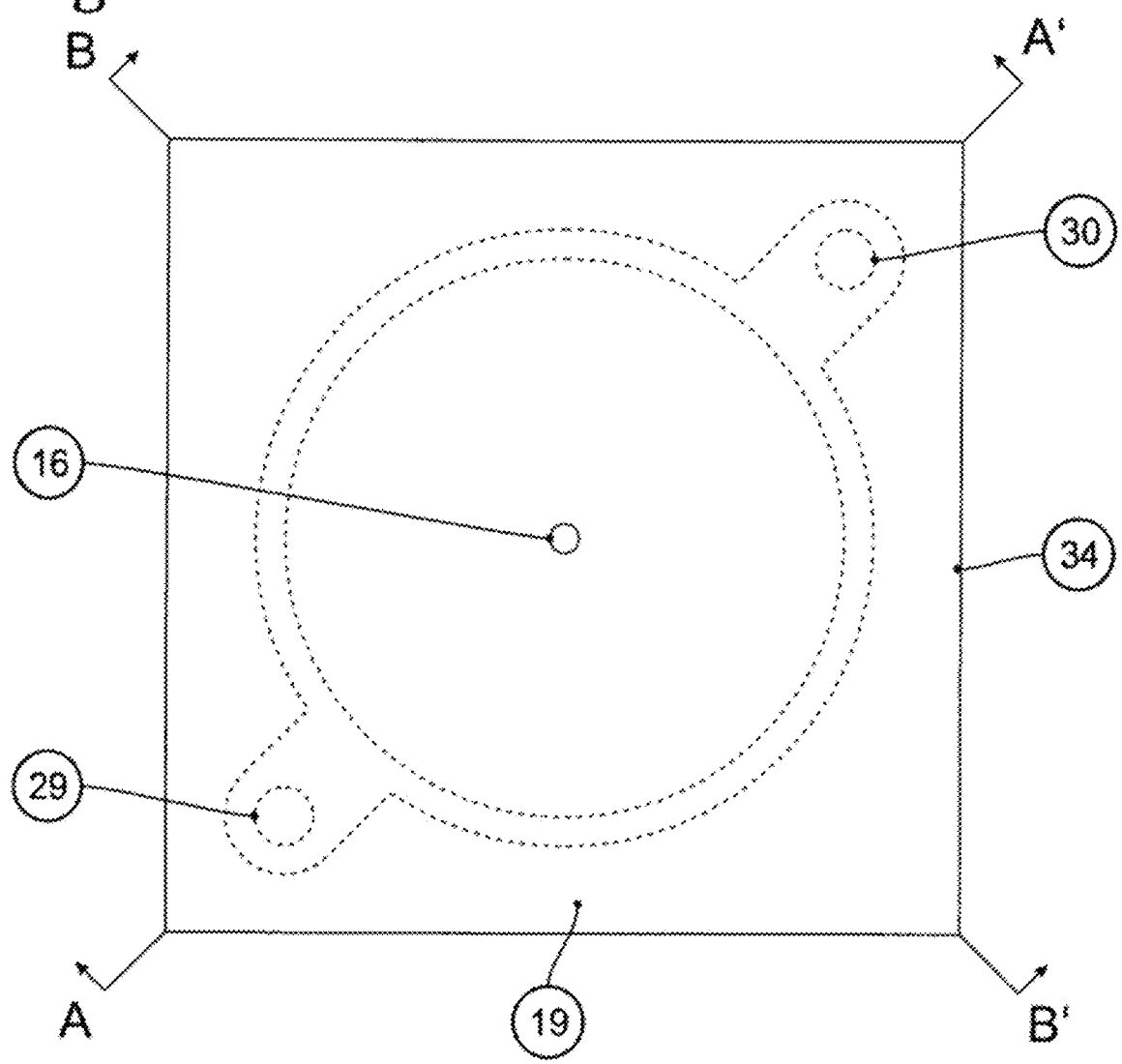

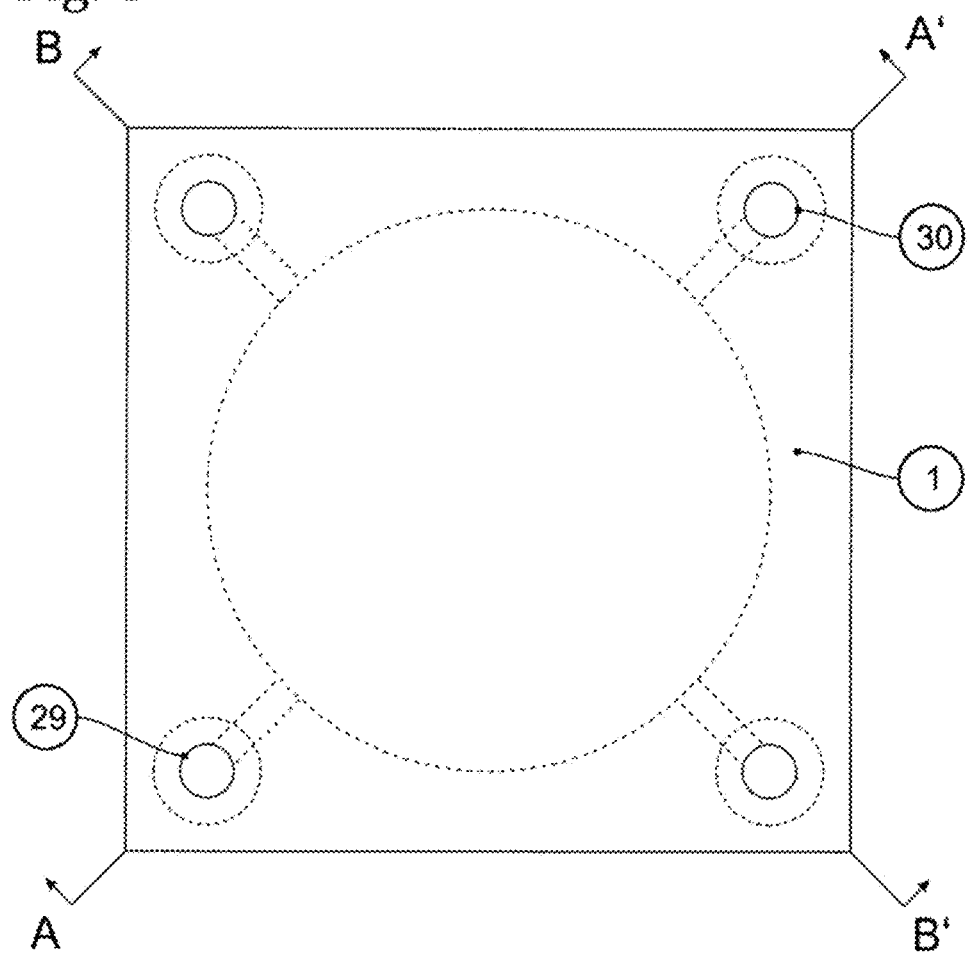

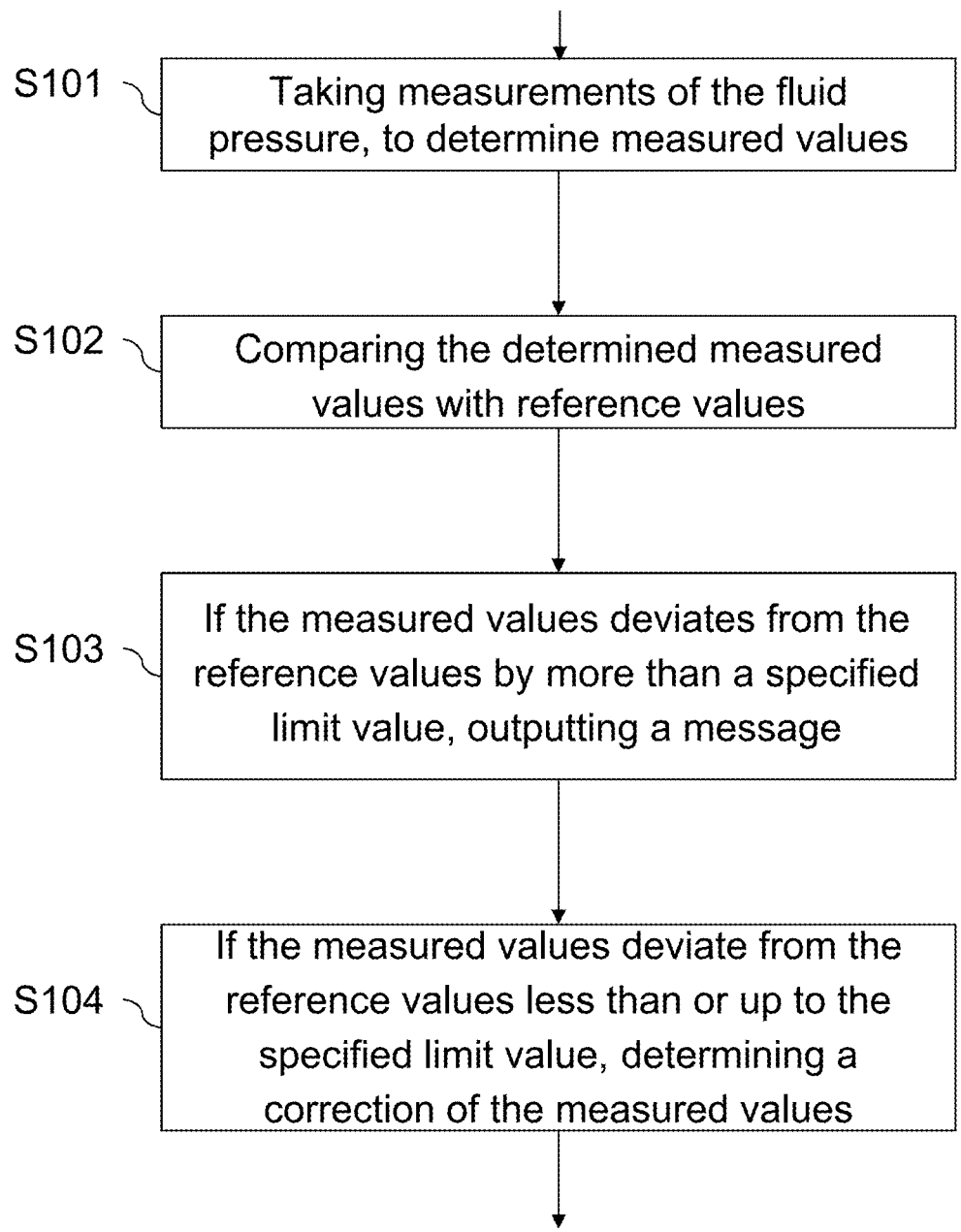

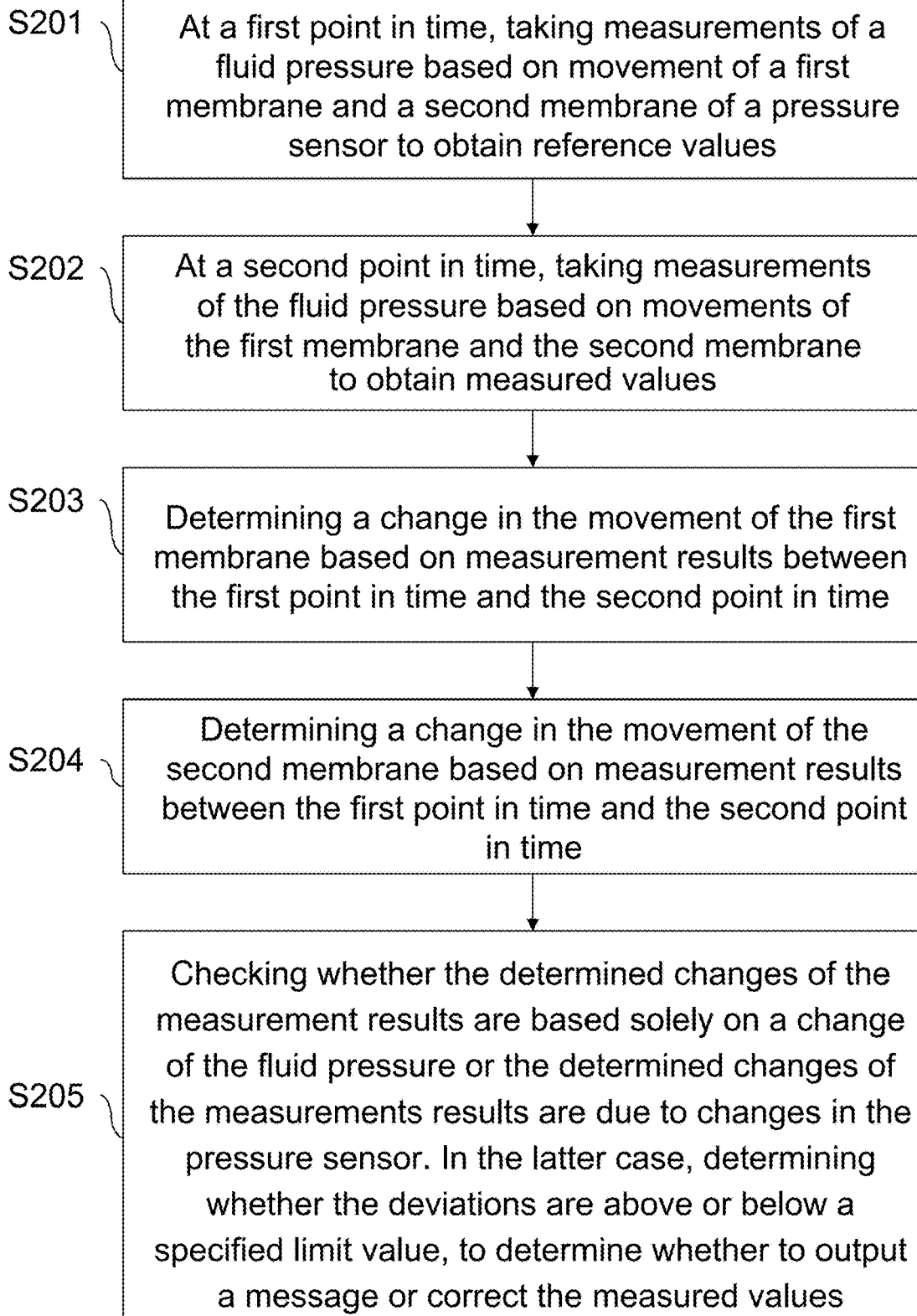

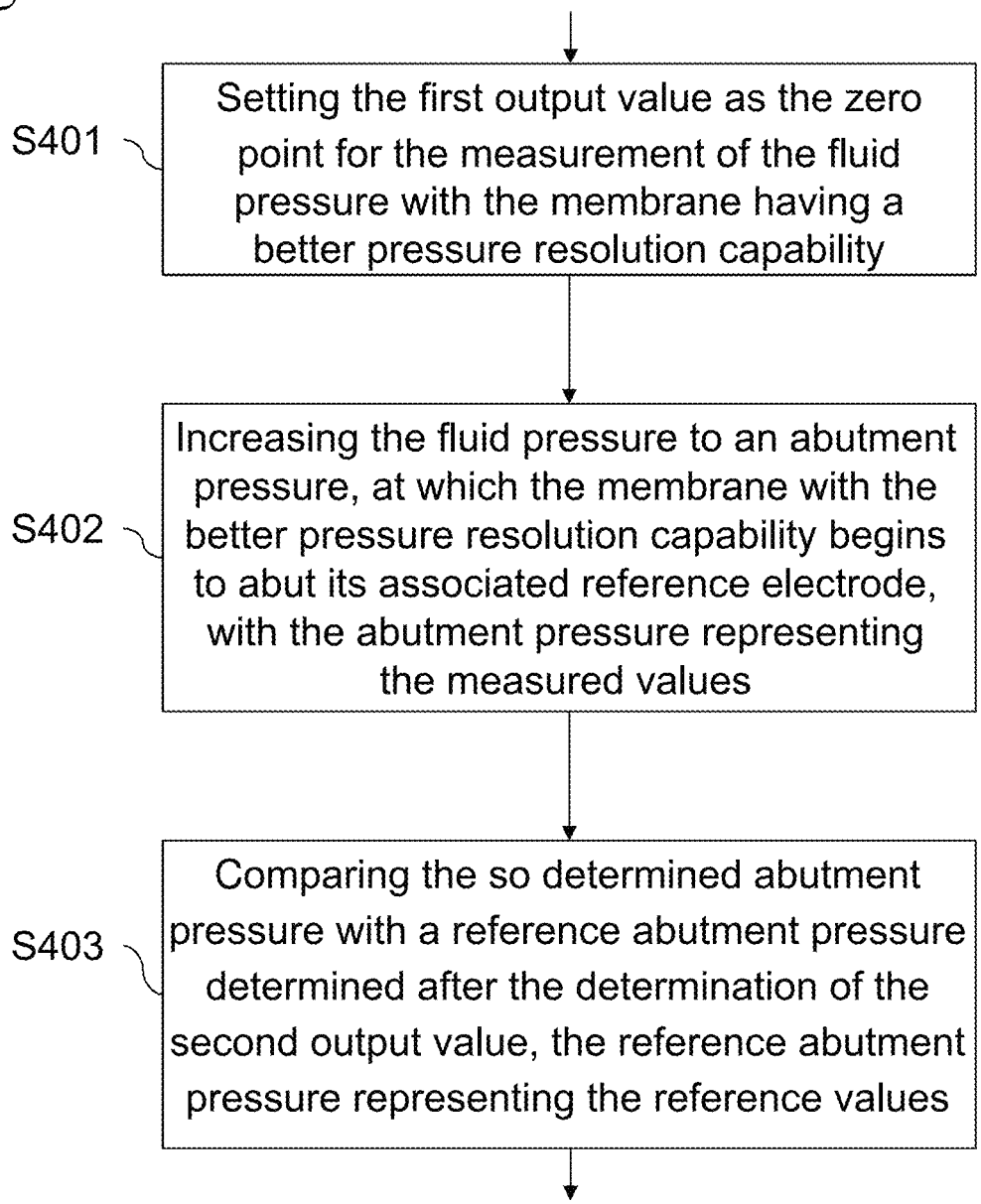

METHOD FOR CORRECTING A DUAL CAPACITANCE PRESSURE SENSOR

CROSS-REFERENCE TO RELATED APPLICATION

This application claims the benefit of German Patent Application No. 102022102437.7, filed Feb. 2, 2022, the contents of which is hereby incorporated by reference in its entirety.

TECHNICAL FIELD

The disclosure relates to a correction method for pressure sensors for measuring a fluid pressure, in particular a vacuum pressure, and a pressure sensor that can carry out the correction method.

BACKGROUND

A "dual range pressure sensor" is known from U.S. Pat. No. 3,484,732, in which pressure sensors of different sensitivity are mechanically arranged one behind the other with strain gauges.

U.S. Pat. No. 4,785,669 describes a capacitance pressure gauge with a membrane that can move freely at low pressure and that abuts and deforms at higher pressure.

So-called "dual range pressure gauges" are also available (e.g. MKS Type D27D), which have a second signal output. However, these are based on one and the same sensor system, wherein only a sub-area is output like a magnifying glass with a specific amplification factor.

Also known are capacitive pressure transducers, for example from EP 1218713, with two chambers, a conductive membrane and an electrode which is elastically connected to the housing element via a pin.

The documents EP 0990127, EP 1800099, EP 1309840 and U.S. Pat. No. 8,333,118 describe capacitive pressure transducers with special spacers.

A capacitance pressure gauge with a special electrode shape is described in U.S. Pat. No. 6,837,112.

U.S. Pat. Nos. 6,425,290 and 8,276,457 disclose pressure sensors with two membranes, these being used to detect differential pressure.

SUMMARY

A goal of the disclosure is to create a pressure sensor for absolute fluid pressure or fluid differential pressure, which can detect a very large measuring range, in particular from six to seven powers of ten in vacuum measurement, in a well reproducible and long-term stable manner and measured values of which can be reliably corrected. This goal is achieved by a correction method for a dual-capacitance pressure sensor as disclosed herein.

In known pressure sensors, the evaluation of the change in capacitance during the deflection of membranes is limited to a range which at best comprises four to five powers of ten of the pressure scale.

However, in many applications, especially in the semiconductor industry, a measuring range of over six to seven powers of ten, e.g. at atmospheric pressure up to $10^{-4}$ hPa, is required. Until now, this required the installation of two separate pressure transducers with different measuring ranges.

In order to achieve this large measuring range with only one pressure sensor, at least two membranes are simultaneously subjected to the same measuring pressure in dual-capacitance pressure gauges, as described in U.S. Pat. No. 9,976,922, which is hereby incorporated by reference in its entirety. The membranes often have different geometries, in particular different sized surfaces and/or completely or partially different wall thicknesses. It is particularly advantageous if the respective outer sides of the membranes are exposed to a common reference vacuum.

The reference vacuum can be provided within a housing which surrounds the membranes and which represents a kind of reference pressure chamber. The reference vacuum can be kept stable by attaching a getter. Furthermore, the reference vacuum can be generated or restored by an ion getter pump ("orbitron").

The arrangement of a control sensor (Pirani) for the reference vacuum is particularly advantageous.

The two membranes are preferably arranged parallel to one another and enclose a minimal intermediate space or measurement volume, which is subjected to the measurement pressure via a small opening or a fluid supply element. When the measuring pressure increases, the rear sides of the membranes move towards reference electrodes, with which a corresponding change in capacitance can be recorded. The signals are fed to an external evaluation circuits via connecting wires and hermetically sealed bushings. Optionally, evaluation chips can be attached on the back side of the reference electrodes (e.g. electrode discs). Another option is to attach heating coils to the back of the electrode discs in order to be able to thermally regulate the entire measuring device in a simple manner.

A method for correcting such a pressure sensor for measuring a fluid pressure is explained below. The pressure sensor has at least a first and a second membrane which are connected to one another in such a way that they enclose a volume of space in a hermetically sealed manner. The first and the second membrane have different geometries. A fluid can be supplied via at least one fluid supply element to the volume of space enclosed by the membranes. Each of the membranes is assigned to one or more reference electrodes which, together with the membrane, generate an electric field. A change in the electric field caused by a membrane movement can be evaluated to measure the fluid pressure. Alternatively, each of the membranes is assigned at least two reference electrodes that generate an electric field. Then, also, a change in the electric field caused by a membrane movement can be evaluated to measure the fluid pressure. The method comprises:

performing measurements of the fluid pressure in order to determine measured values;

comparing the determined measured values with reference values;

if the measured values deviate from the reference values by more than a specified limit value, outputting a corresponding message;

if the measured values deviate from the reference values below or up to the specified limit value, determining a correction of the measured values.

The method is thus based on the idea of using deviations from various reference values to determine whether the sensor configuration has changed over time in such a way that sufficiently precise and/or reliable operation of the sensor is no longer possible. If this is the case, a corresponding message is output, for example via a cable-based or wireless communication link, a display, a loudspeaker, warning lights or the like. In terms of predictive maintenance, a user of the sensor can be informed at an early stage that the sensor quality is deteriorating and that the sensor needs to be replaced/repaired in order to ensure high-quality operation.

If, on the other hand, the deviation is in a range in which it is possible to correct the deviations computationally before the output, for example based on a mathematical model of the sensor, the notification is dispensed with and the necessary correction is made. This allows the sensor to remain in operation for a maximum of time. Alternatively, a message can also be sent in this case that corrections have been made. The sensor is then still functional in operation, but already signals the expected failure.

In particular, the method can be carried out by: at a first time, taking measurements of the fluid pressure based on movements of the first membrane and the second membrane to obtain the reference values; at a second time, taking measurements of the fluid pressure based on movements of the first membrane and the second membrane to obtain the measured values; determining a change in the measurement results based on movements of the first membrane between the first point in time and the second point in time; determining a change in the measurement results based on movements of the second membrane between the first point in time and the second point in time; checking whether the determined changes in the measurement results are based solely on a change in the fluid pressure or whether the determined changes in the measurement results are due to changes in the pressure sensor and, if the latter is the case, determining whether the deviation is above or below the specified limit value in order to determine whether the message is issued or the measured values are corrected.

The correction method is then based on the idea of using the fact that the same pressure is applied to both membranes at the same time. A change in pressure leads to a change in the deflection of each of the membranes and thus to changed measurement results. Measurements taken at different times can therefore serve as reference values and as measured values. If these measurement results do not need to be corrected, the changes follow a specified characteristic, which has either been specified by a mathematical model or determined as part of a calibration. However, if a correction is necessary, i.e. if the changes in the measurement results over time are not determined solely by the changing fluid pressure, this leads to changes of different magnitudes in the respective measurement results due to the different geometries of the membranes. Such a behavior of the measurement results indicates changes in the pressure sensor. This can be used to identify them. Corresponding corrections can be determined, for example, based on an error diagnosis or on a mathematical model. If the changes are too large, this is reported in order to arrange for the sensor to be replaced or repaired.

In this way, the measured values of the pressure sensor can be checked and/or corrected during operation. This enables the sensor to be operated for as long as possible and at the same time allows for predictive maintenance.

In particular, it can be checked whether the determined changes in the measurement results are due to a change in the thickness of the first and second membranes between the first point in time and the second point in time. Assuming that the initial thicknesses of the membranes are known, the physical system has four unknown parameters: the pressure at the first point in time, the pressure at the second point in time, the change in thickness of the first membrane, and the change in thickness of the second membrane. These four unknown parameters are opposed to four measurement processes: the measurements using the first membrane at the first and second point in time and the measurements using the second membrane at the first and second point in time. With appropriate mathematical modeling of the dependency of the deflection of the membranes on the pressure and their geometric shape, i.e. their thickness, it is in principle possible to determine the changes in the thickness of the membranes, which increase, for example due to deposits of the measuring fluid on the membranes, or decrease, for example by etching the membranes.

It is precisely this almost unavoidable detuning of the pressure sensor that can be detected and additionally corrected with the method described without time-consuming recalibration or deconstruction of the pressure sensor, for example by back-calculating the measured/pressure values without an increase in thickness.

By doing so, it can be checked whether the determined changes in the measurement results are due to a change in the thickness of the first and the second membrane by the same amount. This is based on the principle that the same amount of measuring fluid accumulates on both membranes in the same period of time and thus causes the same increase in thickness. The four unknown parameters mentioned above are then reduced to three: increase in thickness and the pressure values at the two measurement point in times. This makes it easier to check the correctness and optionally whether a correction is necessary, as well as the correction itself.

The fluid pressure in the spatial volume at the first point in time and at the second point in time can be the same, for example by applying a known pressure and carrying out the measurements at predetermined times. In this case, without the need for corrections, the measurement results do not change. A need for correction is therefore particularly easy to recognize here. In addition, the number of unknown parameters is reduced since the same, preferably known, pressure is present at both points in time. This makes it easier to determine the changing system parameters, such as the thickness of the membranes, within the framework of mathematical modelling.

The method may additionally or alternatively include: reducing the pressure to a pressure range that is below the resolution capability of the membrane having the better pressure resolution capability; determining a first output value for the electric field generated across the membrane having the better pressure resolution capability, the first output value representing the measured values; comparing the first output value with a second output value, which was determined when the pressure range was previously lowered below the resolution capability, the second output value representing the reference values, which are preferably stored at the factory.

In this way, the correction method makes use of the known zero point calibration of capacitance pressure gauges. As part of the zero point calibration, the fluid pressure is reduced below the resolution capability of the capacitance pressure gauge, preferably by one to two powers of ten. For example, if the membrane with the better resolution has a resolution of $10^{-4}$ mbar, the pressure is reduced to $10^{-5}$ mbar or $10^{-6}$ mbar. Worded differently, if the more sensitive membrane can measure a minimum pressure of $10^{-4}$ mbar, the pressure is reduced to $10^{-5}$ mbar or $10^{-6}$ mbar. For this purpose, the measuring volume is pumped out for a sufficiently long time with a sufficiently powerful pump, e.g. with a turbomolecular pump. Since the pressure reached thereby can no longer be detected by the membrane, an output from the measuring electronics of the membrane that deviates from zero can be set as the new zero point.

If the zero point calibration is repeated at different points in time, it can be expected that the outputs of the measuring electronics will be the same at the zero point, with the sensor structure remaining completely unchanged. Deviations in this output therefore indicate changes in the sensor. These occur in particular when atmospheric pressure prevails in the measurement volume between measurements, since this causes large forces and correspondingly large mechanical stress to act on the membrane. However, deviations can also be caused by deposits on the membrane or by temperature differences between the zero point calibrations.

Through various test series carried out in advance with a plurality of sensors that have been exposed to different conditions in terms of pressure, temperature and fluid composition, a limit value for the deviations between different zero point calibrations can be determined above which the sensor no longer has full accuracy and/or reliability. This can be signaled accordingly. In addition, parameter ranges can be defined for changes that indicate a special type of structural change in the sensor. This can then be corrected mathematically until the limit value for the deviations is exceeded. In this way, predictive maintenance can be achieved based on a standard process such as zero point calibration. Ideally, the reference measurement is carried out during production of the sensor and the value of the zero point calibration determined therein is stored in a memory for later comparisons.

The method can further include: setting the first output value as the zero point for measuring the fluid pressure with the membrane having the better pressure resolution capability; increasing the fluid pressure up to an abutment pressure at which the membrane with the better pressure resolution capability begins to abut its associated reference electrode, the abutment pressure representing the measured values; comparing the abutment pressure determined in this way with a reference abutment pressure determined after the determination of the second output value, wherein the reference abutment pressure represents the reference values.

The sensor is constructed in such a way that the membranes abut the reference electrodes assigned to them as the fluid pressure increases if the pressure becomes too high. The pressure at which the first contact between the membrane and the reference electrode takes place is determined by the mechanical properties of the membrane and should ideally not change. In addition, the abutment pressure can be readily determined, since the relationship between pressure and output capacity changes above this pressure. Changes in the abutment pressure can occur as a result of material accumulating on the membrane or by etching off membrane material. The membrane becomes stiffer or softer as a result, which increases or decreases the abutment pressure.

The abutment pressure therefore offers an opportunity to check whether material deposits are present on the membrane with the better resolution capability or whether the membrane has been etched thinner. In this case, the abutment pressure is measured in a reference measurement after zero point calibration, for example during the production of the sensor. After another zero point calibration, the abutment pressure is measured again. If it deviates from the reference value, the measured values must be corrected. If it deviates by more than a specified limit value, reliable operation of the sensor is no longer possible and a corresponding warning is issued.

Alternatively or additionally, after the zero point calibration, the method can further comprise: setting the first output value as the zero point for the measurement of the fluid pressure with the less sensitive membrane, i.e. the membrane with the poorer pressure resolution capability; increasing the fluid pressure to a measured pressure at which the membrane having the poorer pressure resolution capability begins to indicate a non-zero fluid pressure, the measured pressure representing the measured values; comparing the measured pressure determined in this way with a reference measured pressure determined after the determination of the second output value, the reference measured pressure representing the reference values.

Similar to the abutment pressure, the pressure above which the membrane with the poorer pressure resolution capability outputs measured values can also be used to check the integrity of the sensor. This is because the membrane with the poorer resolution capability is much less sensitive to changes due to material deposits, since it is approximately an order of magnitude thicker than the membrane with the better resolution capability. It is therefore to be expected that the pressure value output by the high-sensitivity membrane with the better resolution capability when the low-sensitivity membrane with the poorer resolution capability begins to measure will always be the same after a zero point calibration. If there are shifts in this pressure value, this indicates a strong impairment of the sensor. This connection can therefore also be used in the context of predictive maintenance or a correction of measured values.

A pressure sensor for measuring a fluid pressure, as has been described above, can have a control unit which is suitable for carrying out the correction methods described above. The pressure sensor therefore has a control device such as a microcontroller or processor, which is able to initiate and carry out the measurements, record and check the measurement results, derive the necessary messages and/or corrective measures from them and output the corrected measured values.

At least one of the first and second membranes can be made of zirconium dioxide. Zirconium dioxide membranes have an advantageously smooth surface such that accumulation of measuring fluid on the membranes is reduced. The pressure sensor is therefore less susceptible to correction. This effect is additionally intensified if the zirconium dioxide is doped with yttrium.

The following detailed description is merely exemplary in nature and is not intended to limit the invention or the application and uses of the invention. Furthermore, there is no intention to be bound by any theory presented in the preceding background or the following detailed description.

BRIEF DESCRIPTION OF THE DRAWINGS

FIG. 3a shows a horizontal cross section of an alternative pressure sensor.

FIG. 3b shows a horizontal cross section of a further pressure sensor.

FIG. 5 show a vertical cross section through another pressure sensor.

FIG. 6 show a vertical cross section through yet another pressure sensor.

FIG. 9 is a flow diagram of a correction method for a pressure sensor.
FIG. 10 schematically shows an example of the method of FIG. 9.
FIG. 12 schematically shows another example of the method of FIG. 9.

DETAILED DESCRIPTION

The invention is explained in more detail below with reference to the exemplary embodiments shown in FIGS. 1 to 12.

Figure 1:
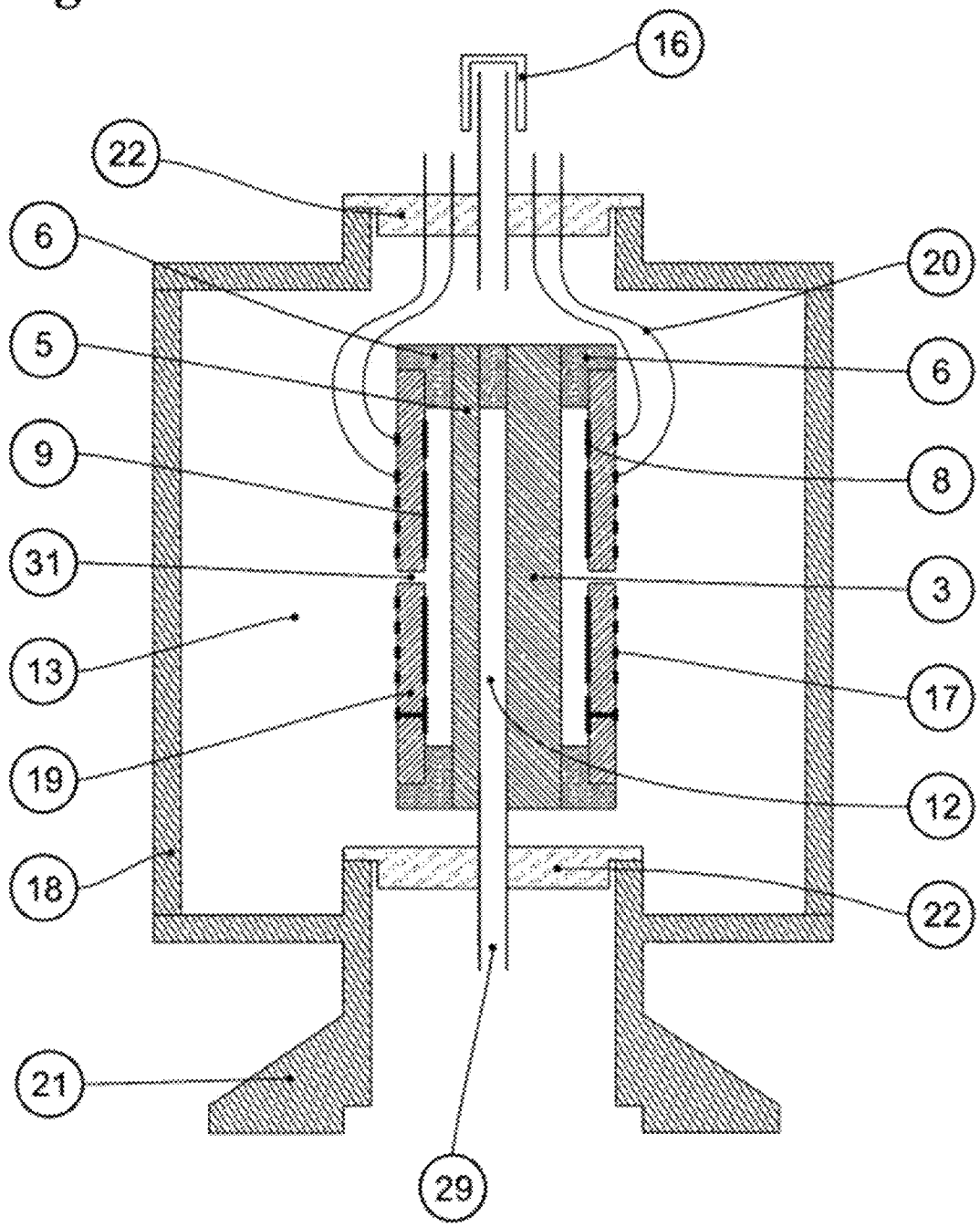
FIG. 1 show a vertical cross section through a pressure sensor.
Figure 2:
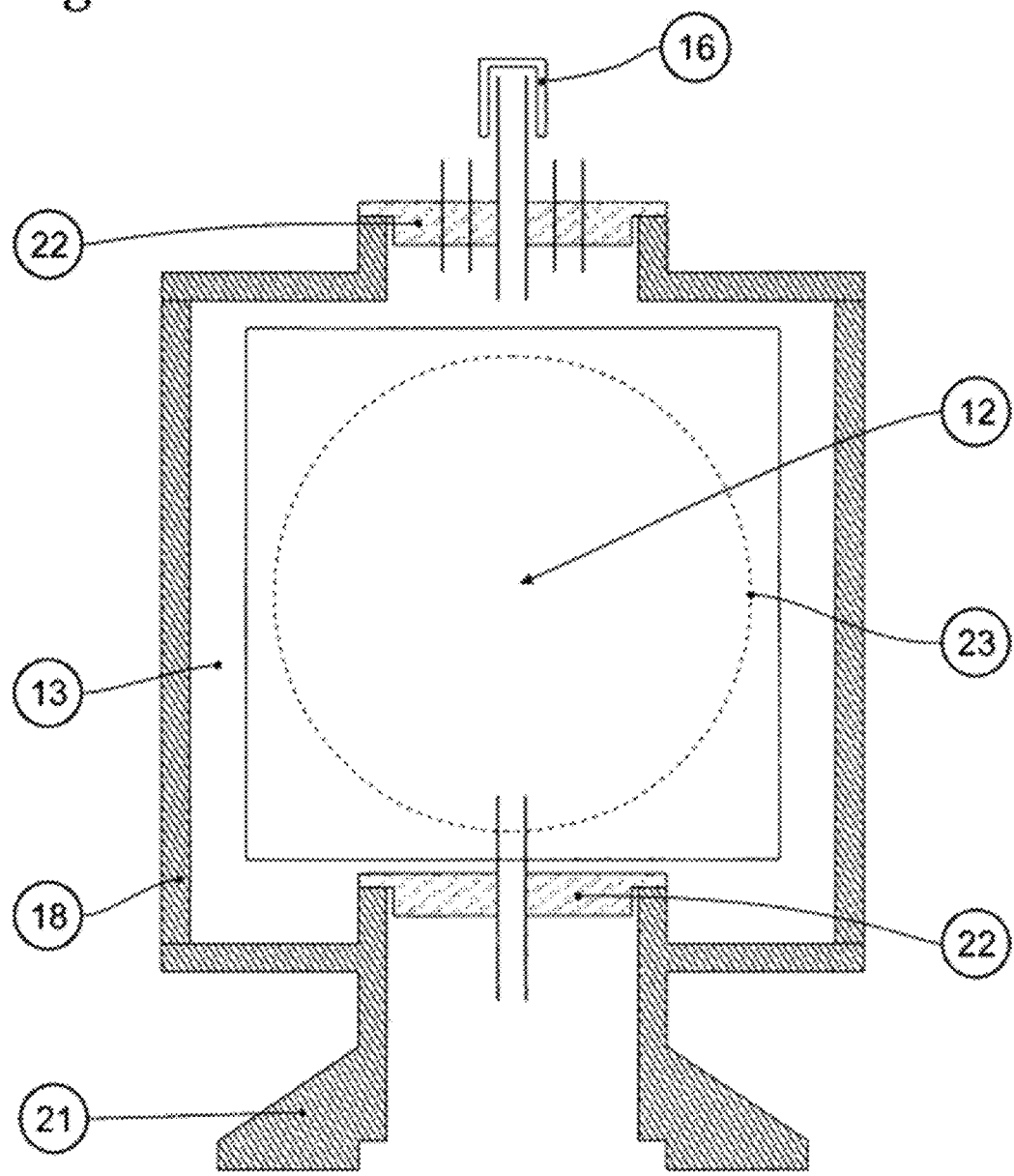
FIG. 2 shows a horizontal cross section of the pressure sensor as in FIG. 1

FIG. 1 and FIG. 2 show cross sectional views offset by 90 degrees from one another through a pressure sensor. Via a vacuum flange 21 and a downstream opening of a TO base 22 (fluid supply element or fluid discharge element), the fluid to be sensed is connected to a small measuring or fluid chamber 12 arranged perpendicularly to the connection surface of the flange 21. The fluid chamber 12 itself is delimited by two membranes 3 and 5, with membrane edges 23, which are round in this case by way of example. The two membranes 3 and 5 preferably have a different thickness from one another.

Roughly parallel to each of the membranes 3 and 5 is a planar, electrically insulating electrode support 19, preferably designed as a ceramic disc, which has at least two reference electrodes on its surface facing the respective membrane 3 and 5. By means of the electrodes 8 and 9 (electrode 1 or electrode 2), pressure-related changes in the distances between the electrically conductive membranes 3 and 5 and the electrode supports 19 can be measured capacitively.

In their edge regions, the two membranes 3 and 5 and the two electrode supports 19 are fixed at a fixed distance from one another by means of spacer layers 6, the edges of the membranes 3 and 5 being hermetically sealed to one another.

The structural unit formed from the electrode supports 19 and the membranes 3, 5 is surrounded by a housing with a housing wall 18, which delimits a reference space 13 in which a constantly desired reference pressure or a vacuum reference can be set.

Compensation openings 31 are provided in the electrode supports 19 to produce a pressure equalization between the reference space 13 and the area enclosed between the electrode supports 19 and the membranes 3 and 5, respectively. If the measured pressure in the fluid supply is higher than the pressure in the reference chamber 13, the thin membrane 5 is initially deflected in the direction of the electrode carrier 19 associated with this membrane 5 when the pressure difference is low. If the measurement pressure continues to rise, the thick membrane 3 is also deflected in the direction of the electrode carrier 19 associated with this thick membrane 3. If the measurement pressure continues to rise, the thin membrane 5 can abut the electrode carrier 19 and be supported by it.

In an overlapping measuring pressure range, both membranes can therefore be deflected without abutting an electrode carrier. The electrode carriers 19 with the spacer layers 6 can advantageously also be designed to be electromagnetically shielding.

The reference pressure is set via a closable opening arranged in the housing 18 (closure 16 of the reference chamber). This opening can be provided, for example, in a second TO base integrated in the housing. Connecting wires, for example, can also be routed through this second TO base, which are used to supply the electrical supply to heating elements of a heater 17 that are attached to the electrode carriers 19.

Figure 3:
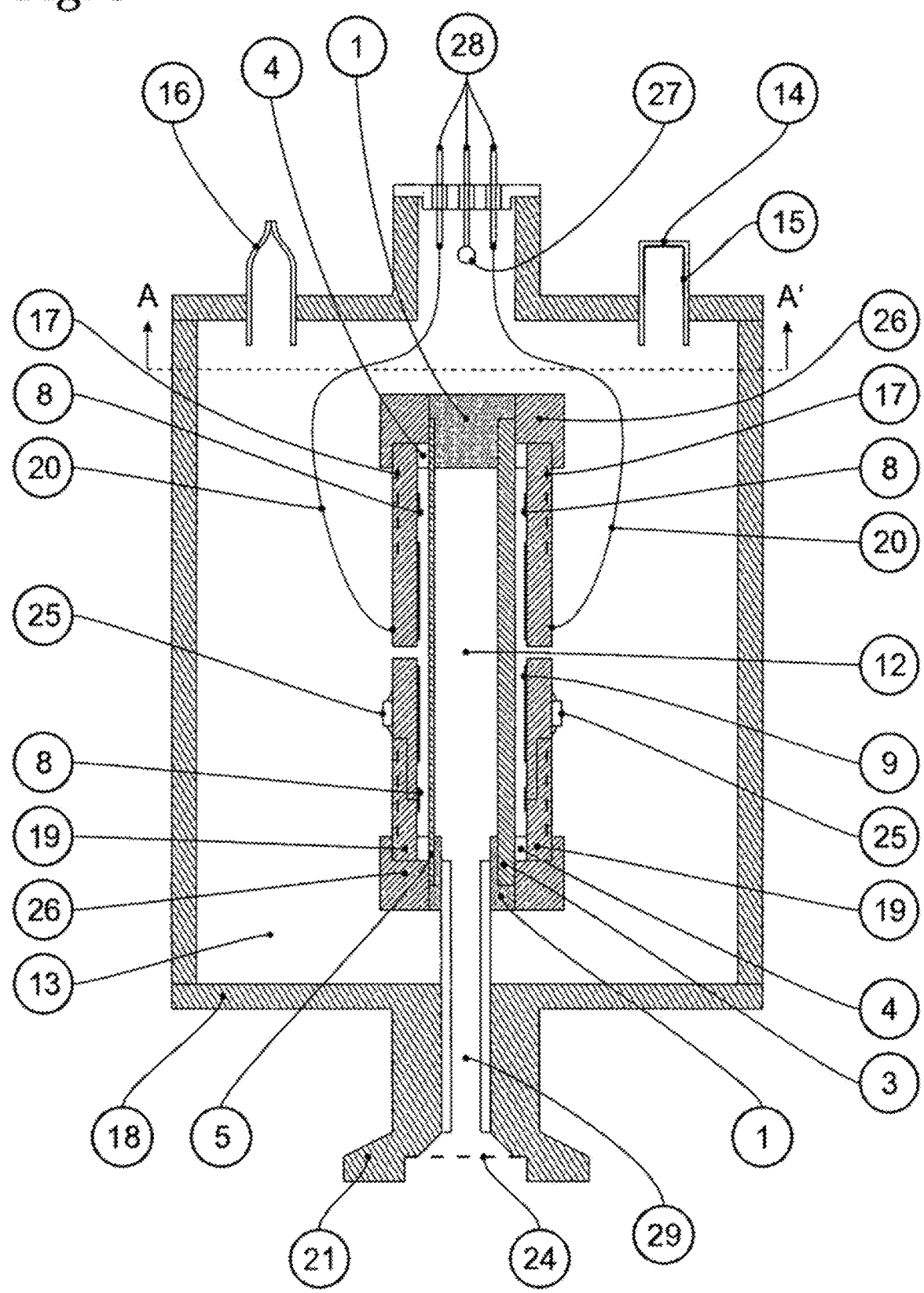
FIG. 3 show a vertical cross section through an alternative pressure sensor.

FIG. 3 shows advantageous developments and features of the exemplary embodiment of a pressure sensor shown in FIG. 1 and FIG. 2

In a further development, a particle filter 24 can be connected upstream of the fluid inlet 29. Optionally, an evaluation electronics 25 arranged within the housing is connected to electrodes 8 and 9 via through-contacts in the ceramic electrode carriers 19. Their signals are routed via supply lines or connection wires 20 to hermetically sealed lead-through pins of connections 28 for a control electronics located outside the housing. Furthermore, a Pirani sensor 27 for monitoring the pressure in the reference space can optionally be connected via such lead-through pins. Further options are a getter holder 14 integrated into the housing wall 18 and the evacuation connection or closure 16 for the reference space 13, which is also set into the housing wall 18 in this exemplary embodiment.

Figure 4:
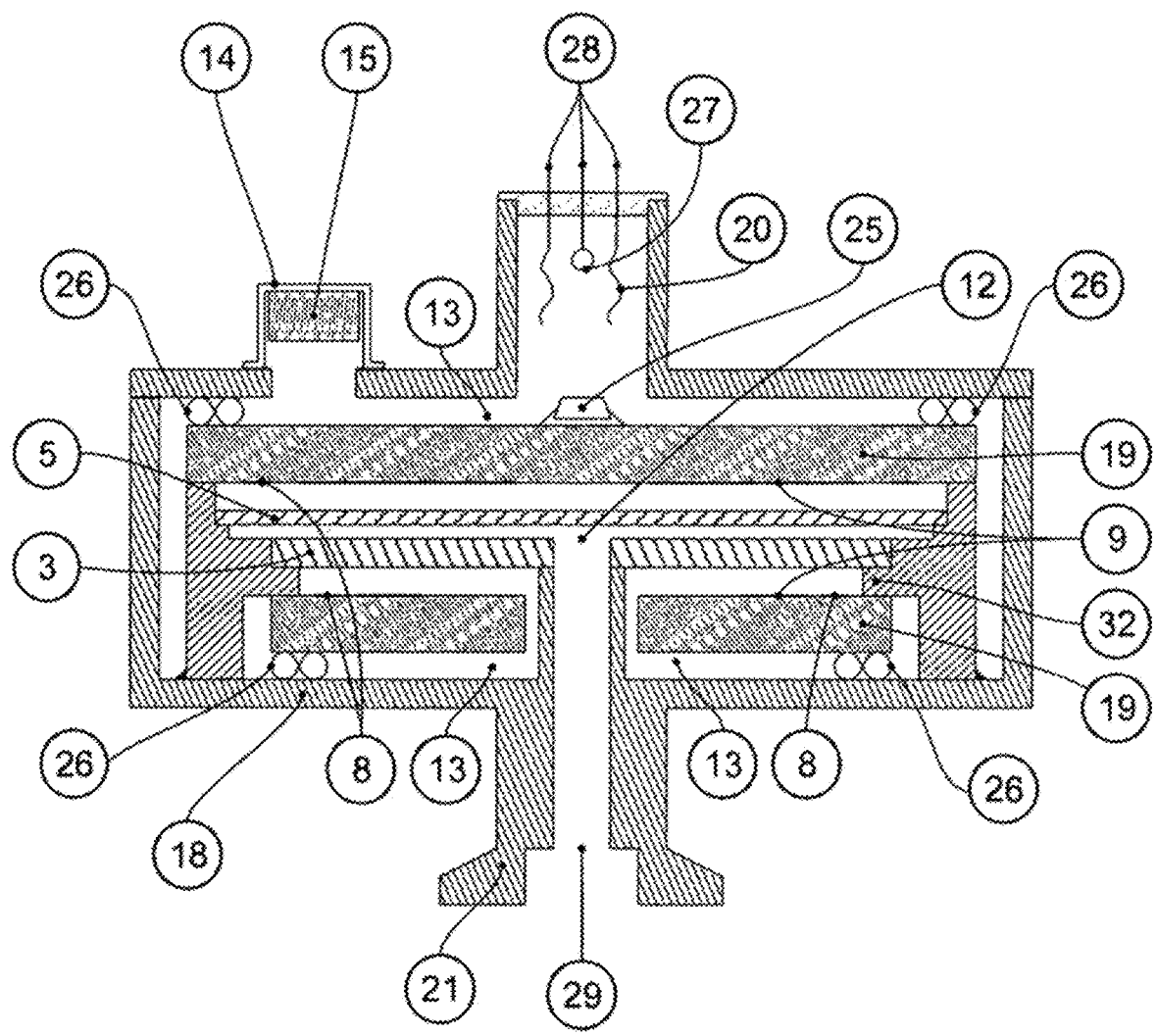
FIG. 4 shows an exemplary pressure sensor with a small form factor.

FIG. 4 shows an exemplary embodiment of a pressure sensor with a small form factor. Due to the fact that it is parallel to the flange surface, a very low overall height is achieved. Staggered contact surfaces on the spacer 32 facilitate assembly of the two membranes 3 and 5 with the required fixed distance from one another. In this case, the membrane 3 is designed as an annular membrane. The spacer 32 is firmly connected to the cup-shaped housing lower part, for example by welding, soldering or gluing. The ceramic 19 closest to the flange has an opening, preferably arranged centrally, for the passage of the fluid inlet 29 to one of the membranes 3, 5. The ceramic 19 serves as a carrier for the electrodes 8 and 9. The essential distances between the two ceramics 19 and the respective associated membrane 3 or 5 can be adjusted by one or more suitable contact surfaces provided on the spacer 32, the two ceramics 19 being connected by means of preferably resilient clamping elements 26 clamped between the wall of the housing 18 and said contact surfaces. All cavities located between the ceramics 19 and the insides of the housing are preferably connected to one another and form the reference space 13.

Figure 5A:
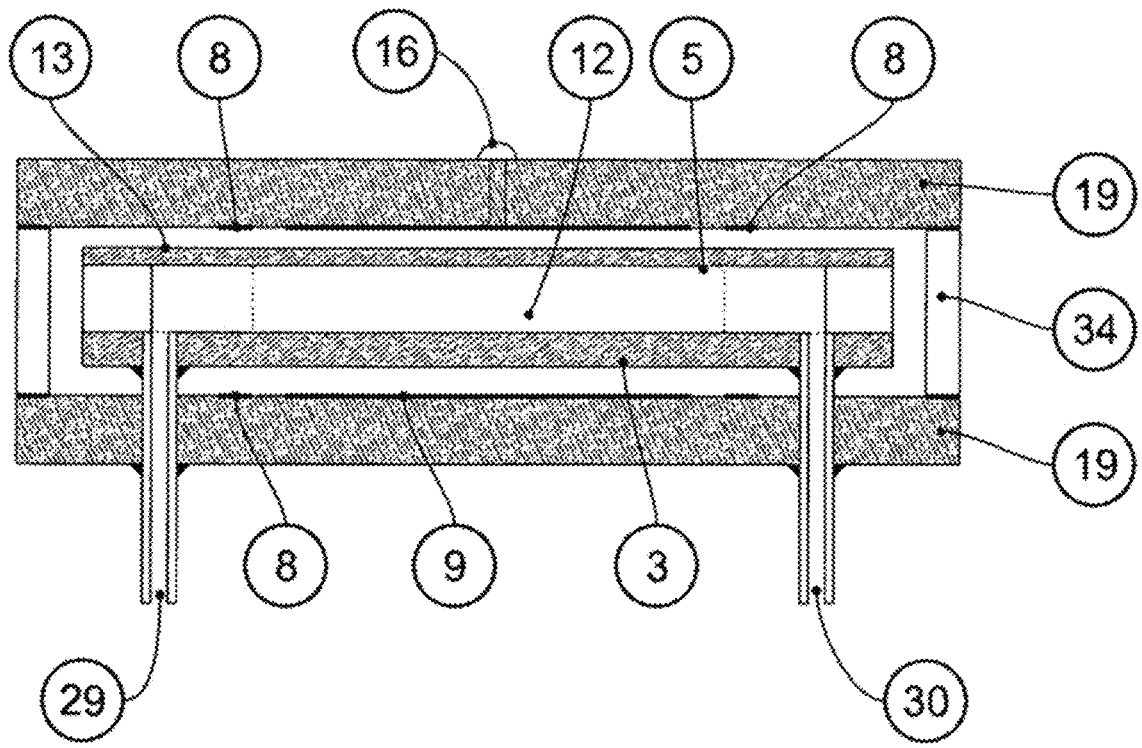
FIG. 5a is a cross sectional view A-A' of FIG. 5.
Figure 5B:
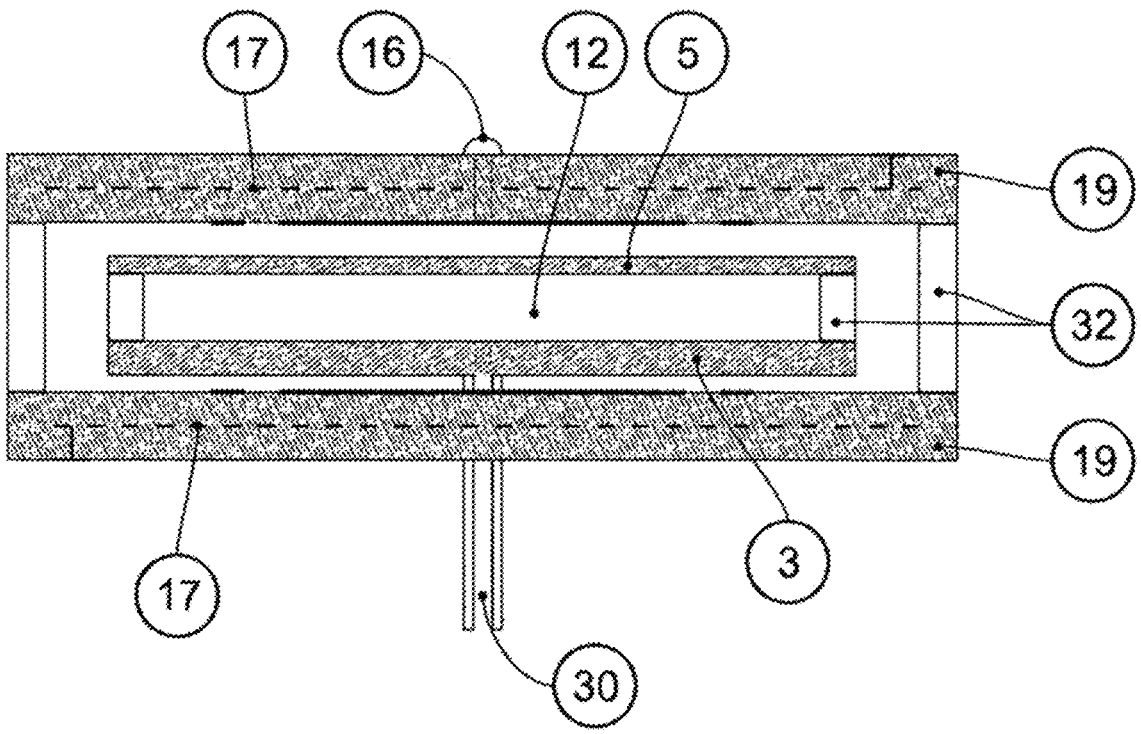
FIG. 5b is a cross sectional view B-B' of FIG. 5.

An embodiment of the invention with a fluid inlet 29 and a fluid outlet 30 is shown in FIGS. 5, 5a and 5b. With such an embodiment, absolute pressure measurements as well as flow and differential pressure measurements are possible. The flat, approximately can-shaped housing shape is formed by two ceramic discs 19 or ceramic plates of any shape spaced at a distance from and parallel to each other, which are connected to each other hermetically sealed at their edges with suitable side walls 33. Two membranes 3 and 5, which are also spaced apart and parallel to one another and which are of different thicknesses, are also connected to one another in a hermetically sealed manner at their edges. Tubular elements for the fluid inlet 29 and the fluid outlet 30, which are tightly connected to the membrane structure, lead into two, for example opposite, edge regions of the membrane interior. These tubular elements are guided through one of the ceramic plates and tightly attached to this ceramic in such a way that the tubes also serve as spacers for setting the required distance between the membranes 3, 5 and the electrodes 8 and 9 arranged on the ceramics 19.

In addition, heating elements of the heater 17 are integrated in the ceramics 19, which are designed in one or more parts.

Figure 6A:
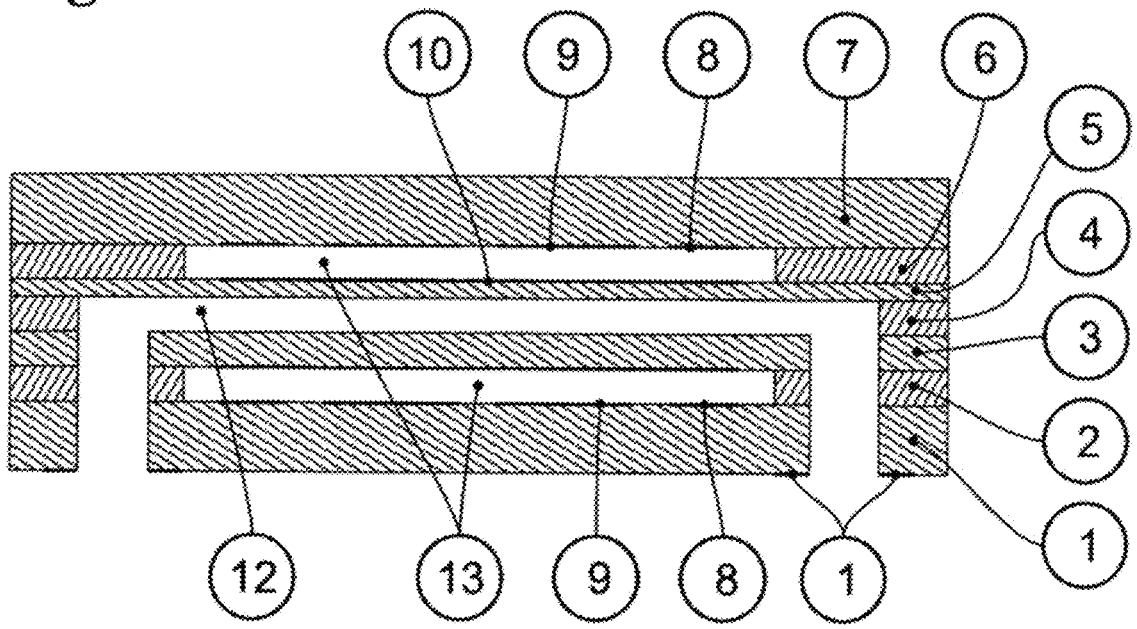
FIG. 6a is a cross sectional view A-A' of FIG. 6.
Figure 6B:
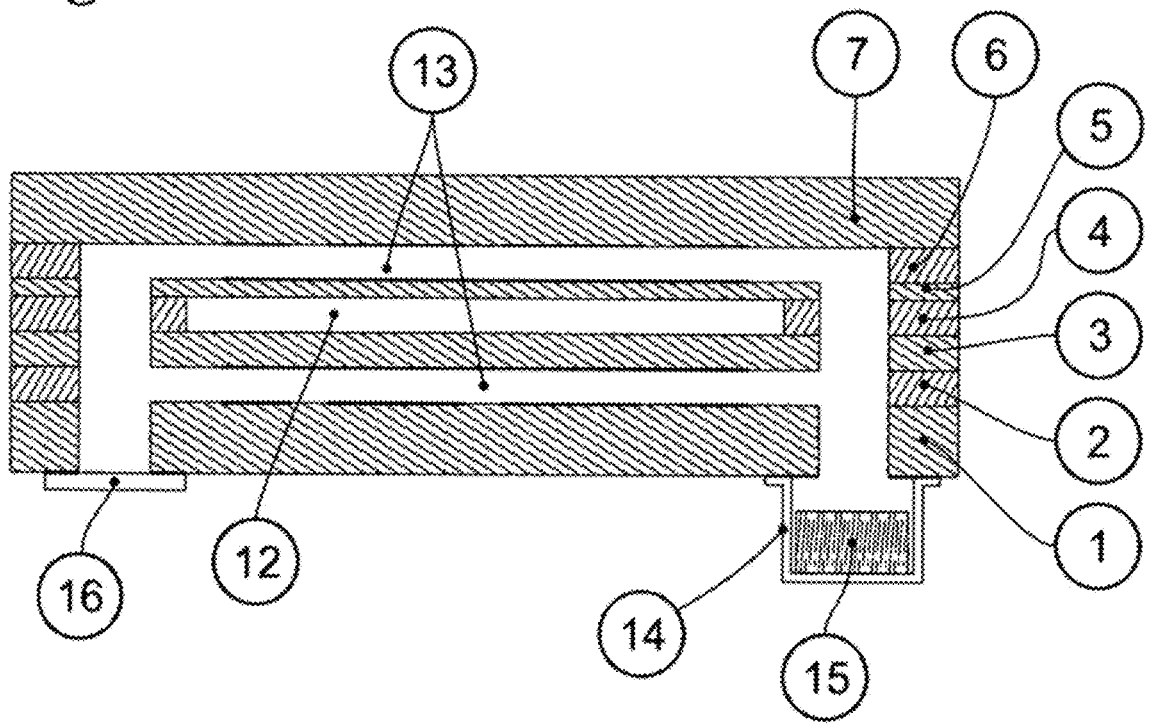
FIG. 6b is a cross sectional view B-B' of FIG. 6.
Figure 7:
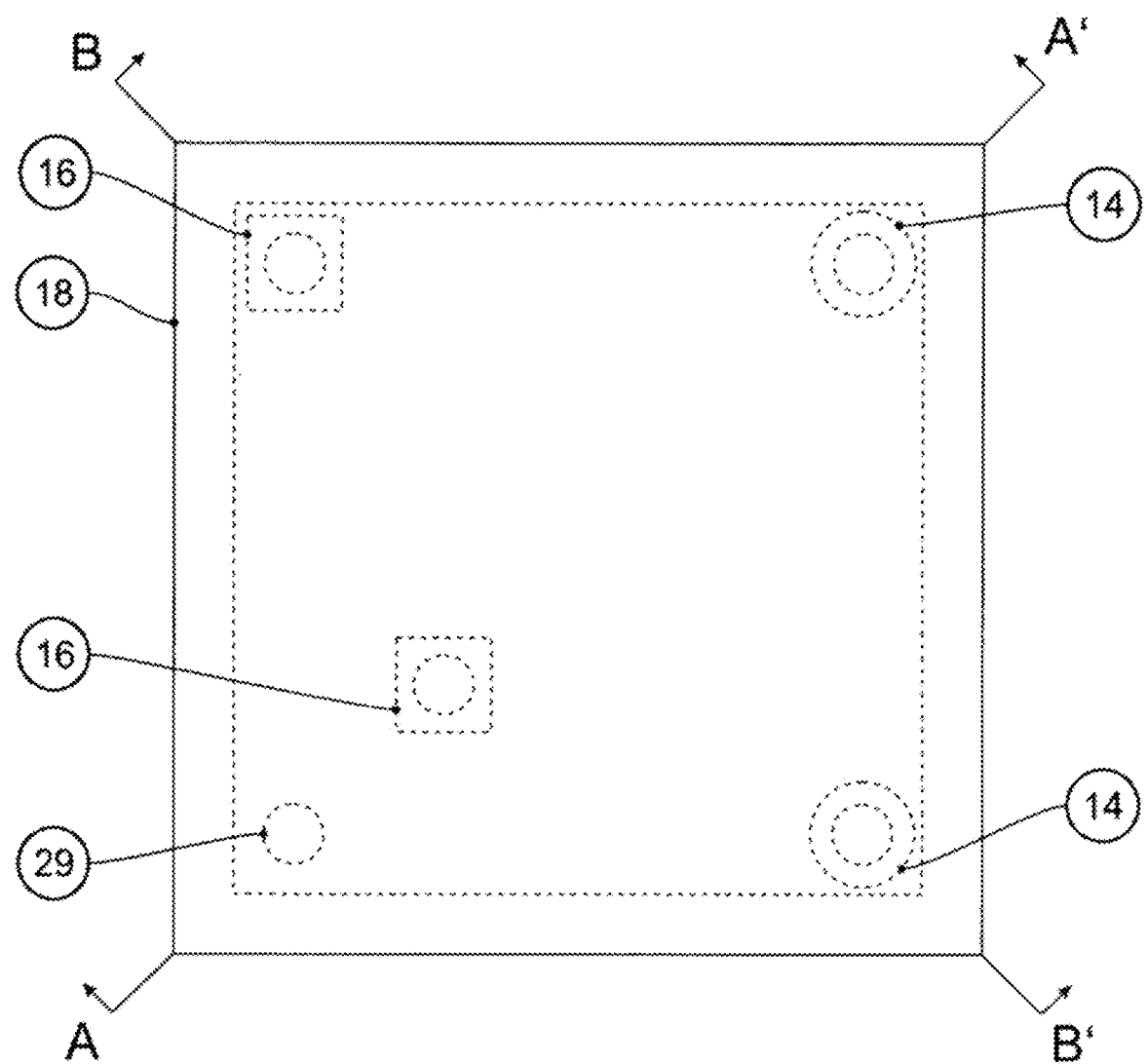
FIG. 7 show a vertical cross section through yet another pressure sensor.
Figure 7A:
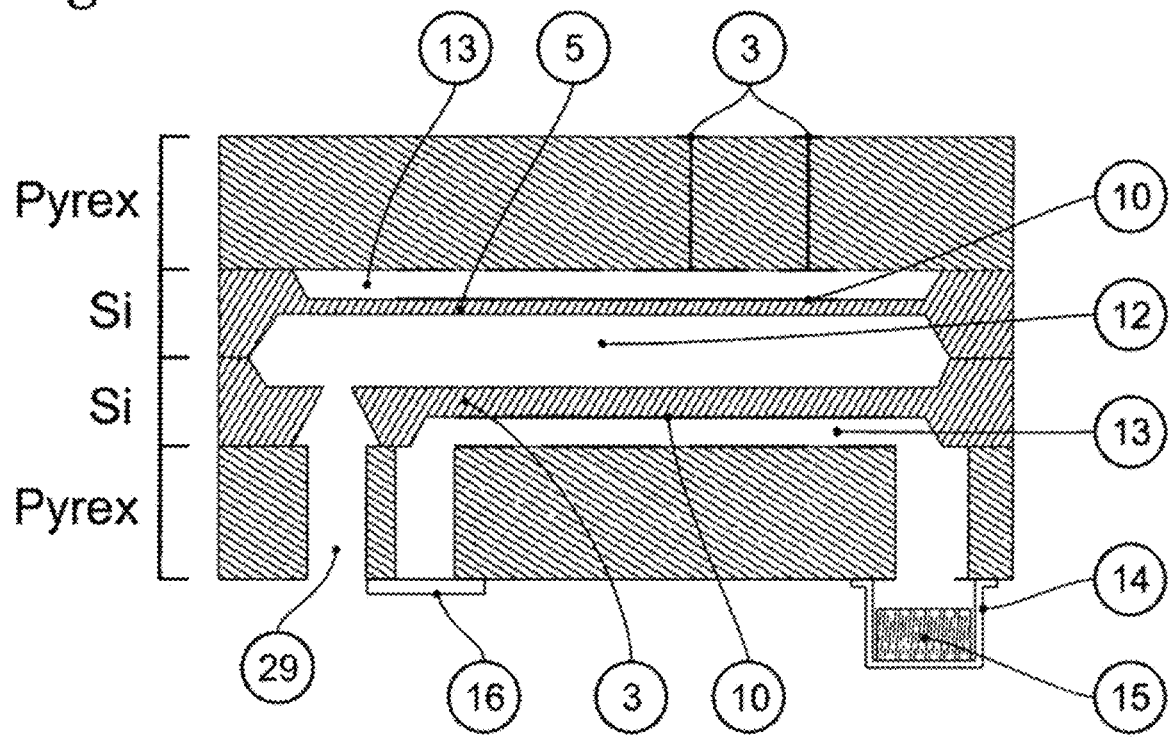
FIG. 7a is a cross sectional view A-A' of FIG. 7.
Figure 7B:
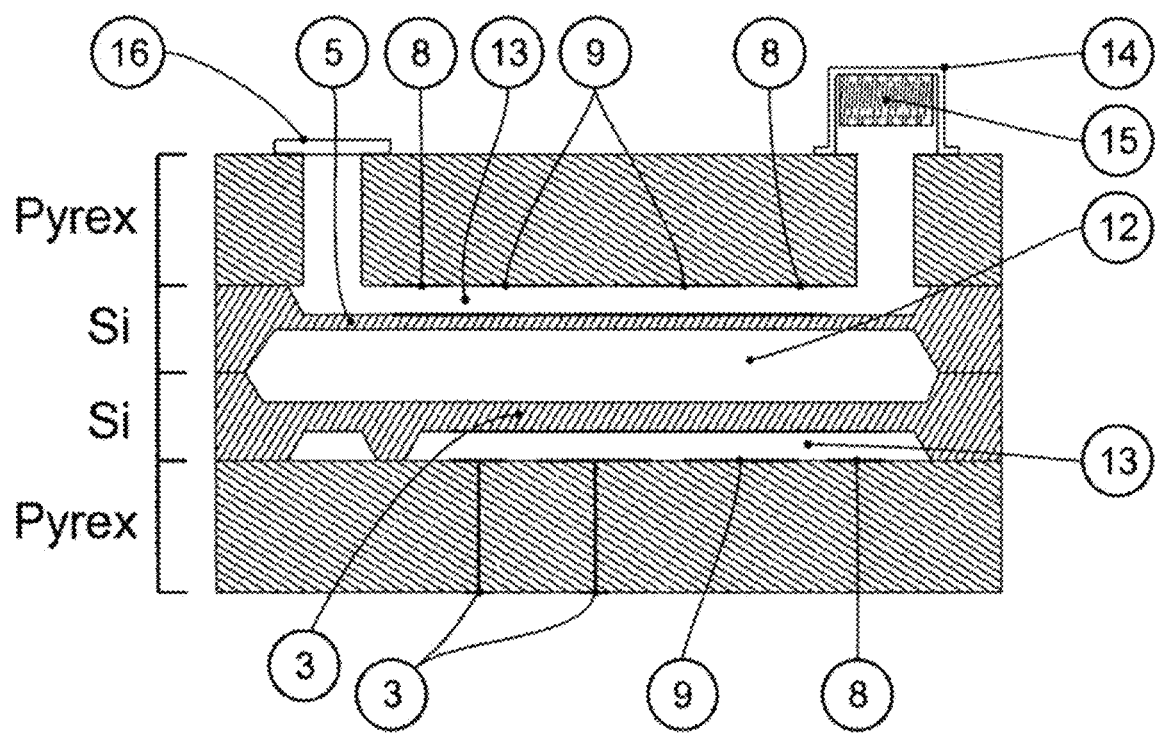
FIG. 7b is a cross sectional view B-B' of FIG. 7.
Figure 8:
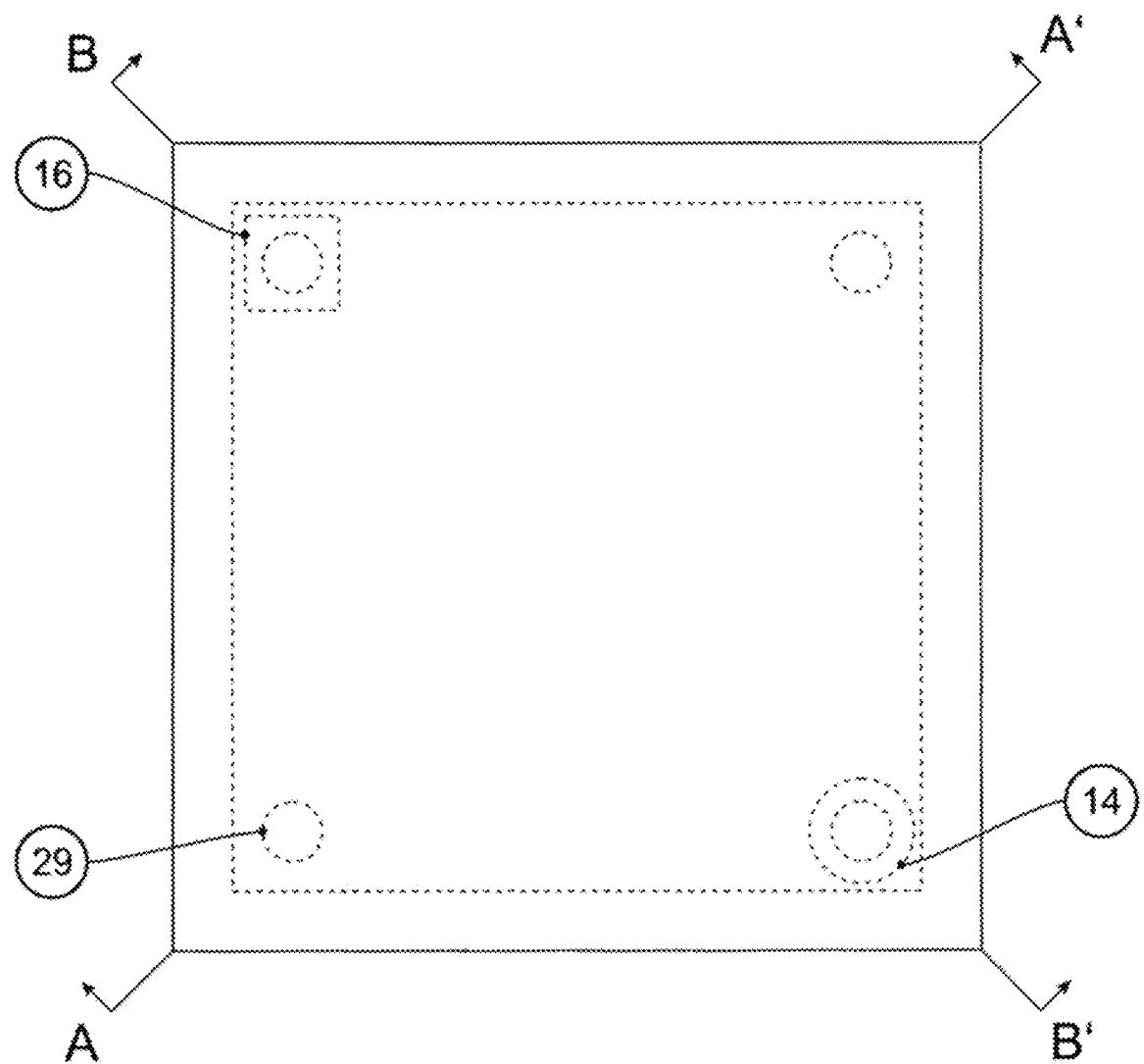
FIG. 8 show a vertical cross section through yet another pressure sensor.
Figure 8A:
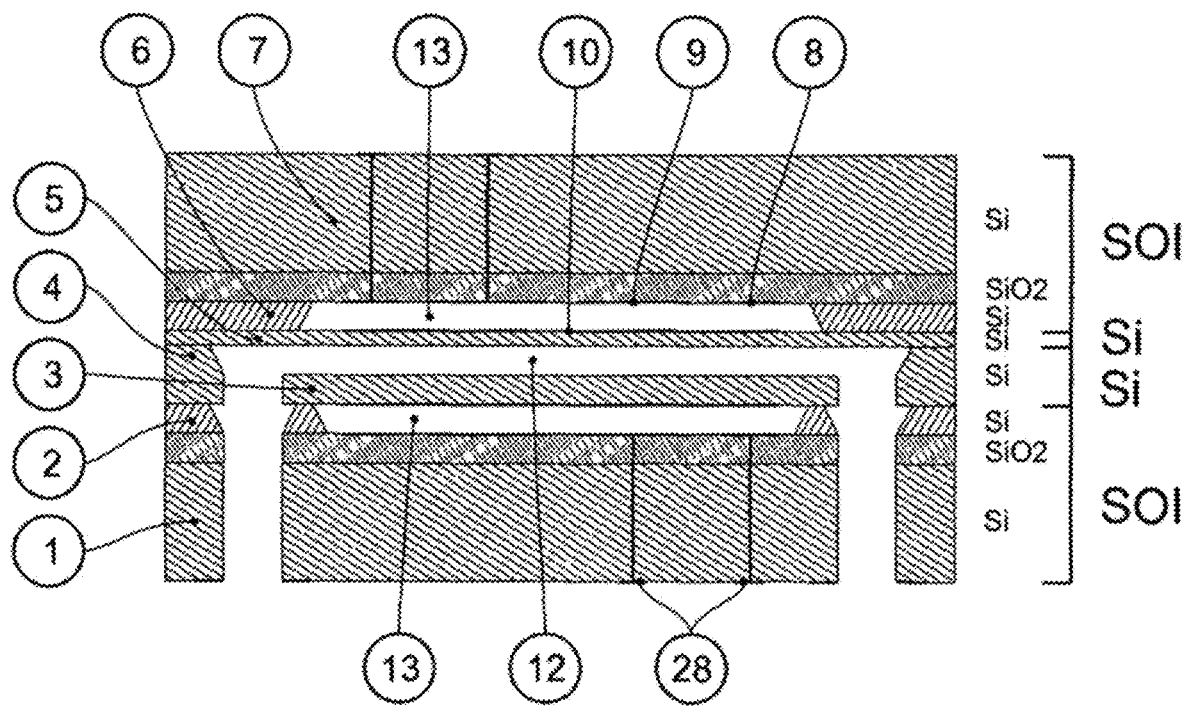
FIG. 8a is a cross sectional view A-A' of FIG. 8.
Figure 8B:
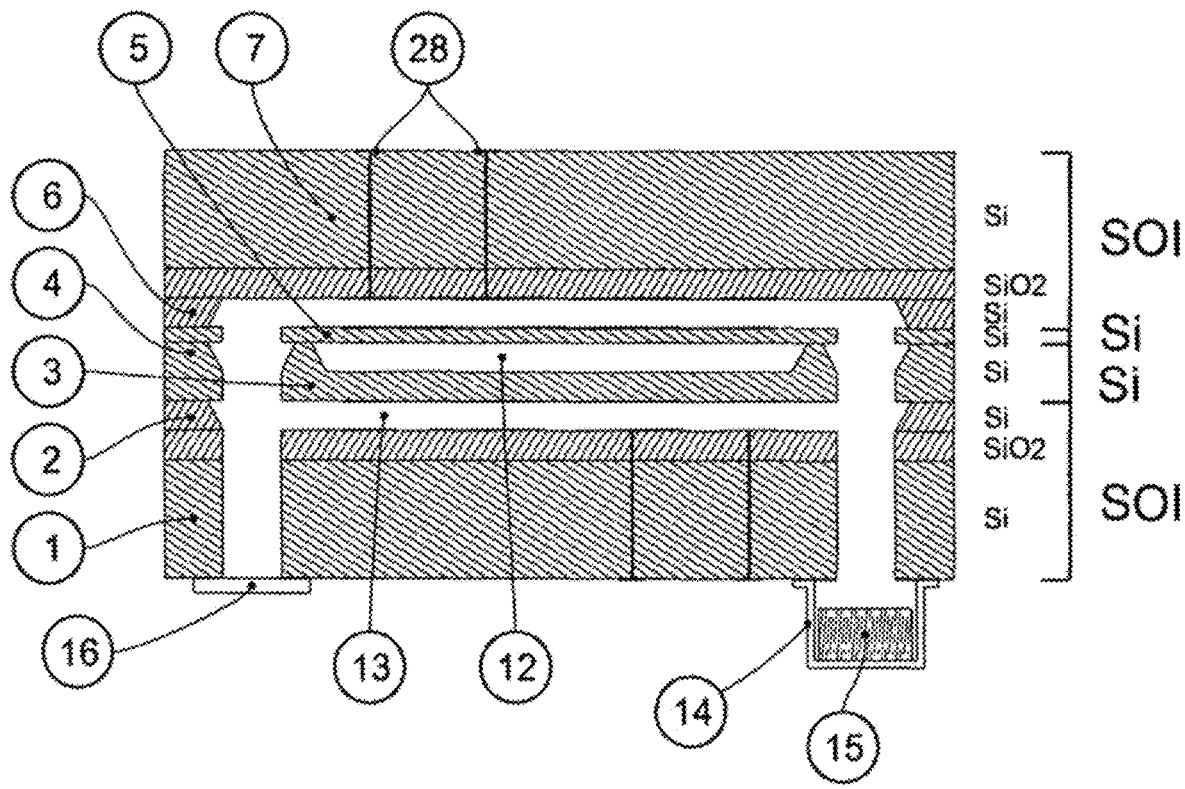
FIG. 8b is a cross sectional view B-B' of FIG. 8.

The fact that a pressure sensor can be formed solely by largely planar materials layered on top of one another is shown in FIGS. 6, 6*a* and 6*b*. Cross sectional FIG. 6*a* shows the structure of such a pressure sensor. Seen from bottom to top, a base plate 1, e.g. made of ceramic with attached electrodes 9, is followed by a spacer layer 2 and a thick membrane layer 3. The spacer layer 2 is cut out over a large area in the area of the membrane 3, e.g. in a circle, to form a lower reference space 13, into which the membrane 3 can move when the pressure increases.

In order to form a suitable measuring space or fluid space 12, the second membrane 5 is arranged at a distance from the first membrane 3 by a further spacer layer 4.

The connection of the fluid chamber 12 with the fluid to be measured takes place here by means of, for example, circular openings in the structural units 1, 2, 3 and 4. The second membrane 5 is placed on the spacer layer 4, which in turn is separated by a recessed spacer layer 6 from which the cover plate 7 closing the entire assembly final is separated. The intermediate space created by the cut-out forms an upper reference space 13. The cover plate 7 and the base plate 1 have electrodes 8 and 9, respectively, which each interact capacitively with the membrane electrode 10 applied to the associated membrane.

As shown in FIGS. 6 and 6*b*, the upper and the lower part of the reference space 13 are connected to one another on two approximately opposite sides and are each accessible from the outside via an opening. One of the openings is optionally provided with getter 15 by means of a getter holder 14, the other can be hermetically sealed with a closure 16.

Further alternative embodiments with a small form factor are shown in FIG. 7, FIG. 7*a*, FIG. 7*b* and FIG. 8, FIG. 8*a*, FIG. 8*b*, which differ in particular by the different, etchable layer materials. In addition, in the embodiment 7, all the connection openings are arranged on one side of the pressure sensor. In the embodiment shown in FIG. 8, these are on opposite surfaces of the pressure sensor.

In all of the pressure sensors described above, at least one of the membranes 3, 5 can be made of zirconium dioxide. This membrane 3, 5 then has an extremely smooth surface, which makes it difficult for parts of the measurement fluid to accumulate on the membrane 3, 5. In addition, zirconium dioxide is chemically less vulnerable and therefore suitable for durable membranes. Doping the zirconium dioxide with yttrium can further enhance the effects mentioned above.

In particular, zirconium dioxide has a smaller modulus of elasticity than aluminum oxide, for example, and has good chemical resistance and long-term stability. A membrane made of zirconium dioxide offers a higher sensitivity than a membrane made of aluminum oxide. In addition, a zirconium dioxide membrane has a smoother surface than an aluminum oxide membrane. This is partly due to the smaller grain size of zirconium dioxide.

A correction method that can be carried out with each of the pressure sensors described above in the overlap measurement pressure range is shown schematically in FIG. 9.

At S101, fluid pressure measurements are taken to determine measured values.

At S102, the determined measured values are compared with reference values.

If the measured values deviate from the reference values by more than a specified limit value, a corresponding message is output at S103.

If the measured values deviate from the reference values below or up to the specified limit value, a correction of the measured values is determined in S104.

In this way, maximum sensor operation can be combined with predictive maintenance.

FIG. 10 schematically shows an example of the method of FIG. 9. At S201, measurements of the fluid pressure based on movements of the first membrane and the second membrane are taken out at a first point in time in order to obtain the reference values.

At S202, fluid pressure measurements are performed based on movements of the first membrane and the second membrane to obtain measured values at a second point in time.

At S203, a change in the measurement results based on movements of the first membrane between the first point in time and the second point in time is determined.

At S204, a change in the measurement results based on movements of the second membrane between the first point in time and the second point in time is determined.

At S205, it is checked whether the determined changes in the measurement results are based solely on a change in the fluid pressure or whether the determined changes in the measurement results are due to changes in the pressure sensor. If the latter is the case, it is determined whether the deviation is above or below the specified limit value in order to determine whether the message is output or the measured values are corrected.

In this way, it can be determined in a simple and reliable manner whether the measured values of the pressure sensors described above need to be corrected.

Figure 11:
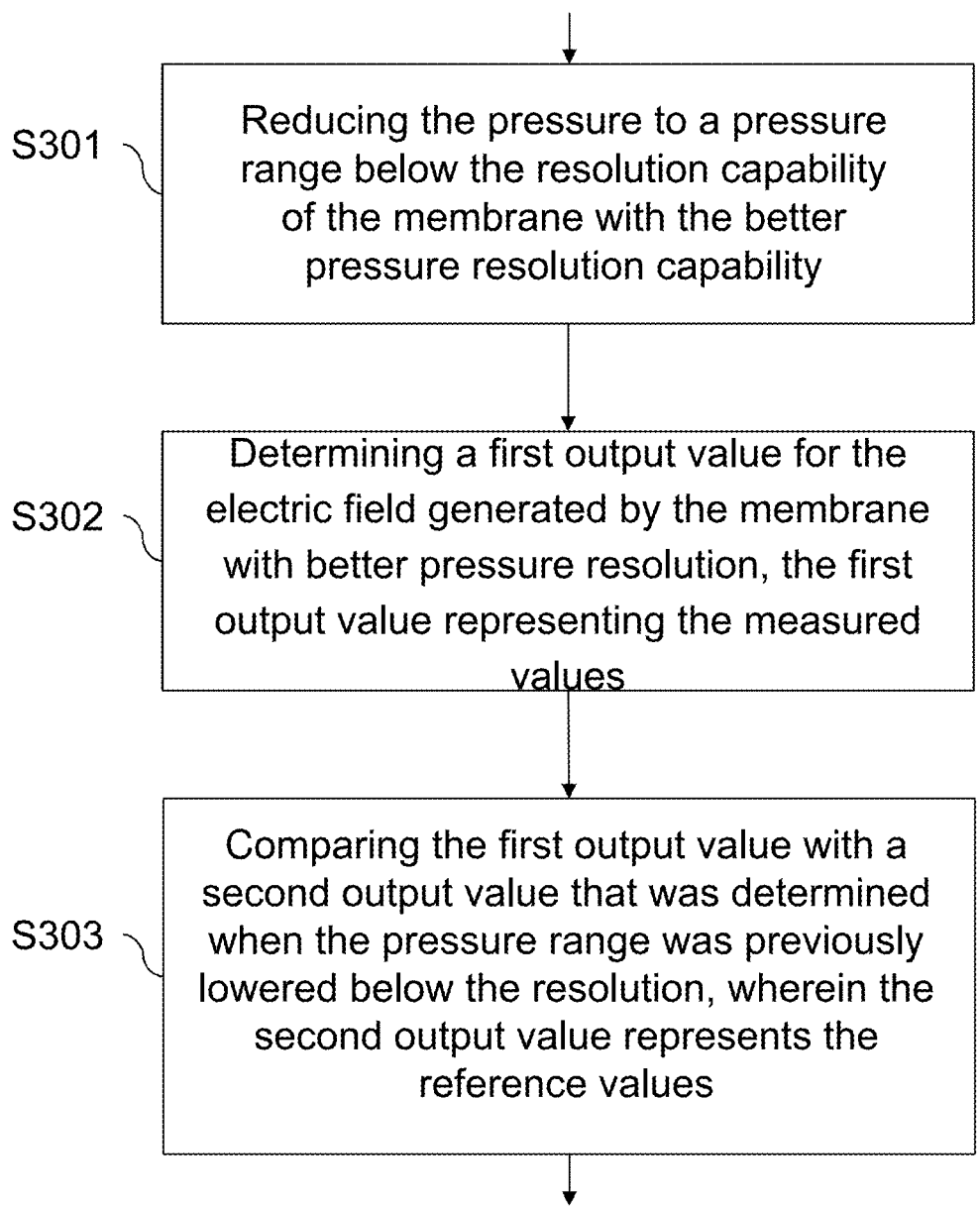
FIG. 11 schematically shows a further example of the method of FIG. 9.

A further example for the method shown in FIG. 9 is shown in FIG. 11. At S301, the pressure is reduced to a pressure range that is below the resolution capability of the membrane with the better pressure resolution capability.

At S302, a first output value is determined for the electric field generated by the membrane with better pressure resolution, the first output value representing the measured values.

At S303, the first output value is compared with a second output value that was determined when the pressure range was previously lowered below the resolution, wherein the second output value represents the reference values.

In this way, the zero point calibration can be used for checking the sensor and for predictive maintenance.

Based on the method of FIG. 11, the method of FIG. 12 can also be used to implement the method of FIG. 9.

At S401, the first output value is set as the zero point for measuring the fluid pressure with the membrane having the better pressure resolution capability.

At S402, the fluid pressure is increased up to an abutment pressure at which the membrane with the better pressure resolution capability begins to abut its associated reference electrode, with the abutment pressure representing the measured values.

At S403, the abutment pressure determined in this way is compared with a reference abutment pressure determined after the determination of the second output value, the reference abutment pressure representing the reference values.

In this case, the abutment pressure can be used to check the integrity of the sensor. Likewise, the pressure at which the membrane with the poorer resolution capability begins to output non-zero measured values could also be used to compare measured values with reference values and thereby obtain information about the susceptibility of the sensor to faults or a necessary replacement/repair.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

REFERENCE LIST 1 base plate
2 spacer layer
3 thick membrane layer
4 spacer layer
5 thin membrane layer
6 spacer layer
7 cover plate
8 reference electrode, electrode 1
9 reference electrode, electrode 2
10 membrane electrode (or full metal membrane)
11 metallization
12 fluid space
13 reference space, reference pressure chamber
14 getter mount
15 getter
16 closure of reference space or evacuation port
17 heating, heating elements
18 housing, housing wall
19 reference electrode carrier, ceramic
20 leads to heating, electronics or electrodes
21 vacuum flange
22 TO socket
23 membrane edge
24 particle filter (net)
25 evaluation electronics in the reference vacuum
26 clamping, direct or with a spring element
27 pirani sensor for reference pressure monitoring
28 connections to the control electronics
29 fluid delivery element, fluid inlet
30 fluid extraction element, fluid outlet
31 compensation opening
32 spacer
33 sidewall

What is claimed is:

1. A method for correcting a pressure sensor for measuring a fluid pressure, the pressure sensor having
a first membrane (3) and
a second membrane (5),
wherein the first membrane (3) and the second membrane (5) are connected to one another in such a way that they enclose a spatial volume in a hermetically sealed manner, and
wherein the first membrane (3) and the second membrane (5) have different geometries,
wherein a fluid can be supplied to the spatial volume enclosed by the membranes via a fluid supply element (29), and
wherein
each of the membranes (3, 5) is assigned to one or more reference electrodes (8, 9) which generate an electric field together with the assigned membrane (3, 5), wherein a change in the electric field caused by a movement of the first membrane (3) and the second membrane (5) is evaluated for measuring the fluid pressure, or
each of the membranes (3, 5) is assigned at least two reference electrodes (8, 9) which generate an electric field, wherein a change in the electric field is evaluated for measuring the fluid pressure,
the method comprising:
taking measurements of the fluid pressure to determine measured values;
comparing the determined measured values with reference values;
determining, based on the comparing, if a thickness of the first membrane and the second membrane has changed;
outputting a message if the measured values deviate from the reference values by more than a specified limit value; and
determining a correction of the measured values if the measured values deviate from the reference values below or up to the specified limit value.

2. The method of claim 1, further comprising:
at a first point in time, taking measurements of the fluid pressure based on movements of the first membrane and the second membrane to obtain the reference values;
at a second point in time, taking measurements of the fluid pressure based on movements of the first membrane and the second membrane to obtain the measured values;
determining a change in the measurement results based on movements of the first membrane between the first point in time and the second point in time;
determining a change in the measurement results based on movements of the second membrane between the first point in time and the second point in time;
checking whether the determined changes in the measurement results are based solely on a change in the fluid pressure or whether the determined changes in the measurement results are due to changes in the pressure sensor; and
determining, in case the determined changes in the measurement results are due to changes in the pressure sensor, whether the deviation is above or below the specified limit value in order to determine whether the message is output or the measured values are corrected.

3. The method of claim 2,
wherein it is checked whether the determined changes in the measurement results are due to a change in thickness of the first membrane and the second membrane by the same amount.

4. The method according to claim 2,
wherein the fluid pressure in the volume of space is the same at the first point in time and at the second point in time.

5. The method according to claim 1, further comprising:
reducing the pressure to a pressure range that is below a resolution capability of the second membrane, the second membrane having a better pressure resolution capability than the first membrane;
determining a first output value for the electric field generated across the second membrane, the first output value representing the measured values; and
comparing the first output value with a second output value, which was determined when the pressure range was previously lowered below the resolution capability, the second output value representing the reference values.

6. The method of claim 5, further comprising:

setting the first output value as a zero point for measuring the fluid pressure with the second membrane;

increasing the fluid pressure up to an abutment pressure at which the second membrane begins to abut its associated reference electrode, the abutment pressure representing the measured value; and comparing the abutment pressure determined in this way with a reference abutment pressure determined after the determination of the second output value, the reference abutment pressure representing the reference values.

7. The method of claim 5, further comprising:

setting the first output value as a zero point for the measurement of the fluid pressure with the first membrane, the first membrane having a lower pressure resolution capability than the second membrane;

increasing the fluid pressure to a measured pressure at which the first membrane begins to indicate a non-zero fluid pressure, the measured pressure representing the measured values; and comparing the measured pressure determined in this way with a reference measured pressure determined after the determination of the second output value, the reference measured pressure representing the reference values.

8. A pressure sensor for measuring a fluid pressure, comprising:

at least one first and one second membrane (3, 5) which are connected to one another in such a way that they enclose a spatial volume in a hermetically sealed manner and which have different geometries, wherein the fluid can be supplied to the spatial volume enclosed by the membranes via at least one fluid supply element (29), and wherein each of the membranes (3, 5) is assigned to one or more reference electrodes (8, 9) which generate an electric field together with the assigned membrane (3, 5), wherein a change in the electric field caused by a movement of the first membrane (3) and the second membrane (5) is evaluated for measuring the fluid pressure, or each of the membranes (3, 5) is assigned at least two reference electrodes (8, 9) which generate an electric field, wherein a change in the electric field is evaluated for measuring the fluid pressure; and a control unit, wherein the control unit is configured to perform the method of claim 1.

9. The pressure sensor according to claim 8, wherein the first membrane (3) or the second membrane (5) is made of zirconium dioxide.

10. The pressure sensor according to claim 9, wherein the zirconium dioxide is doped with yttrium.

\* \* \* \* \*